UNITED STATES PATENT OFFICE

DOUGLAS FRANK TWISS AND EDWARD ARTHUR MURPHY, OF BIRMINGHAM, ENGLAND, ASSIGNORS TO DUNLOP RUBBER COMPANY LIMITED, A BRITISH COMPANY

MANUFACTURE OF ARTICLES FROM RUBBER AND SIMILAR MATERIALS

No Drawing. Application filed October 2, 1928, Serial No. 309,891, and in Great Britain October 5, 1927.

This invention is concerned with an improved method for shaping or moulding articles formed by dipping shapes or moulds into aqueous dispersions of or containing rubber or similar materials, which will form deposits upon the shapes or moulds when they are withdrawn. The invention is particularly applicable for the manufacture of those articles containing enlargements such as football bladders, enemas, or bulbs for motor horns.

According to the invention the improved method consists in directly forming deposits from concentrated and/or compounded aqueous dispersions of rubber or similar materials upon temporary collapsible shapes introduced into the dispersions in a distended condition, and in then collapsing and withdrawing the shapes from the formed and shaped articles after they are dried. If desired the temporary collapsible shapes may be provided with collapsible framework which is adapted to be withdrawn from the formed articles.

The temporary shapes are conveniently made of vulcanized rubber having a smooth outer surface. They may be adapted to be distended by air or by fluid or by powdery substances in order to form the temporary shapes or alternatively they may only require to be collapsed in order to be withdrawn.

The reference above to a football bladder, enema or bulb for motor horn illustrates how the temporary shape which itself is suitably attached to a rod or form is to act in forming the requisite enlargement.

The temporary shape of rubber such as a tube of smooth rubber in distended condition is dipped into a concentrated and/or compounded aqueous natural or artificial dispersion comprising rubber, gutta percha, balata or similar substances or a mixture of any of the same containing, if desired, any of the usual compounding ingredients including vulcanizing agents. These and equivalent materials are designated as rubber materials or rubber media. The dispersions may if desired be prevulcanized. Concentrates prepared as described in specification No. 232,705 are particularly suitable for carrying out the method of this invention.

If desired the temporary shape may on leaving the dispersions be dipped into a heated dehydrating and setting medium such as a heated solution of for instance, calcium chloride or ammonium acetate to increase the setting of the deposit.

The dippings in the dispersions may be repeated several times until the desired thickness of material is obtained. Each time the temporary shape is removed from the aqueous dispersion it may be immersed in the aforesaid solution to increase the setting of the deposit before it is re-dipped again in the aqueous dispersion. If desired the temporary shape may be immersed in water before being re-dipped into the dispersion.

When a sufficient thickness is obtained the coated temporary shape is withdrawn and after the deposit has been dried and if necessary vulcanized it is deflated and withdrawn leaving the shaped article. If necessary compressed air may be utilized to assist in separating the collapsed member from the formed article.

What we claim is:—

1. A method of manufacturing hollow articles of rubber or similar materials which consists in directly separating a deposit of dispersed rubber media from an aqueous dispersion thereof on a shaping surface and thereafter collapsing said surface from said deposit.

2. A method for the manufacture of hollow articles of rubber material which consists in directly separating a deposit of dispersed rubber media from an aqueous dispersion thereof on to a shaping surface and thereafter collapsing said surface from said deposit and withdrawing said surface therefrom.

3. A method of manufacturing hollow articles of rubber material which comprises separating a deposit of dispersed rubber media from an aqueous dispersion thereof on to a shaping surface, dipping said deposit into a heated dehydrating and setting medium and thereafter collapsing and removing said surface from said deposit.

4. A method of manufacturing hollow articles of rubber material which consists in directly separating a deposit of dispersed rubber media from an aqueous dispersion thereof on to a shaping surface, treating said deposit with a dehydrating and setting medium, repeating said deposition of rubber media and said dehydrating and setting operation to form a deposit of the desired thickness and thereafter collapsing and removing said surface from said deposits.

5. A method of forming hollow rubber articles which comprises distending a collapsible form, supporting said distended form with a collapsible framework, dipping said distended and supported form into an aqueous dispersion of rubber substance and forming a deposit of the dispersed media on said form, removing said collapsible frame, drying said deposit and removing the collapsible form from said dried deposit.

6. A method of forming hollow rubber articles which comprises distending a collapsible form, supporting said distended form with a collapsible framework, dipping said distended and supported form into an aqueous dispersion of rubber media and forming a deposit of dispersed media thereon, removing said form from said dispersion, removing the collapsible frame from said form, drying said deposit of rubber, removing and collapsing said collapsible form while inserting a volume of air between said form and said dried deposit.

In witness whereof, we have hereunto signed our names.

DOUGLAS FRANK TWISS.
EDWARD ARTHUR MURPHY.